Dec. 23, 1941.                G. L. N. MEYER                 2,267,616
                                CONVEYER
                          Filed Nov. 1, 1938              5 Sheets-Sheet 1

Inventor:
George L. N. Meyer.
By Eugene H. Simpson
Attorney.

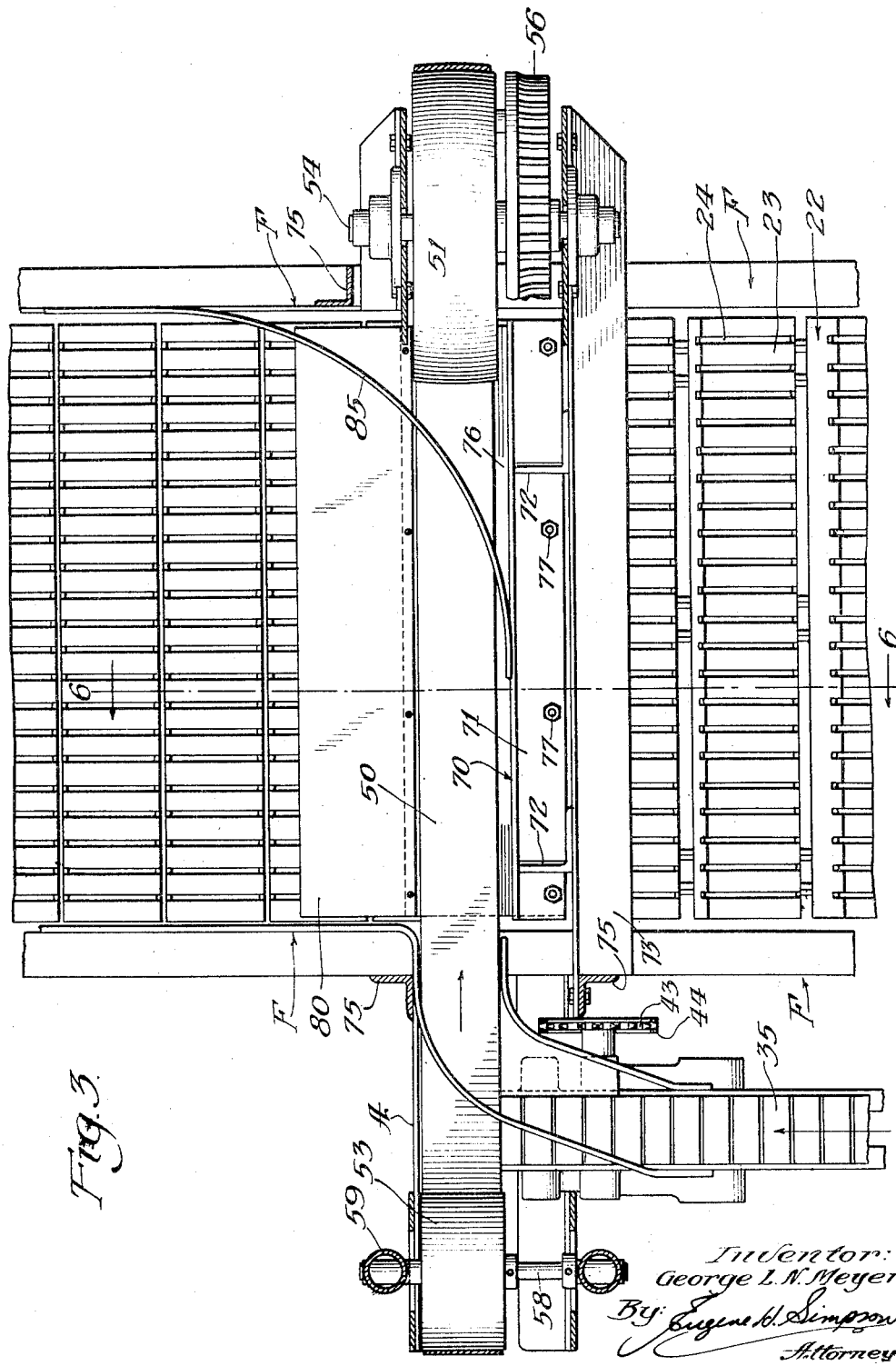

Dec. 23, 1941.  G. L. N. MEYER  2,267,616
CONVEYER
Filed Nov. 1, 1938  5 Sheets-Sheet 4
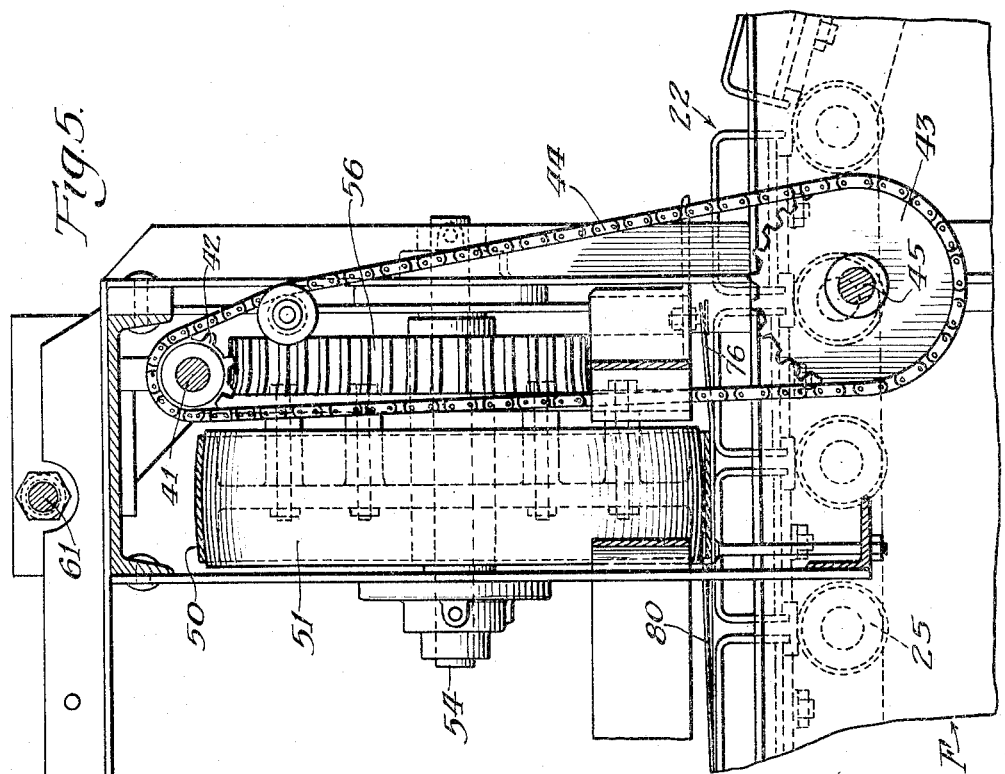
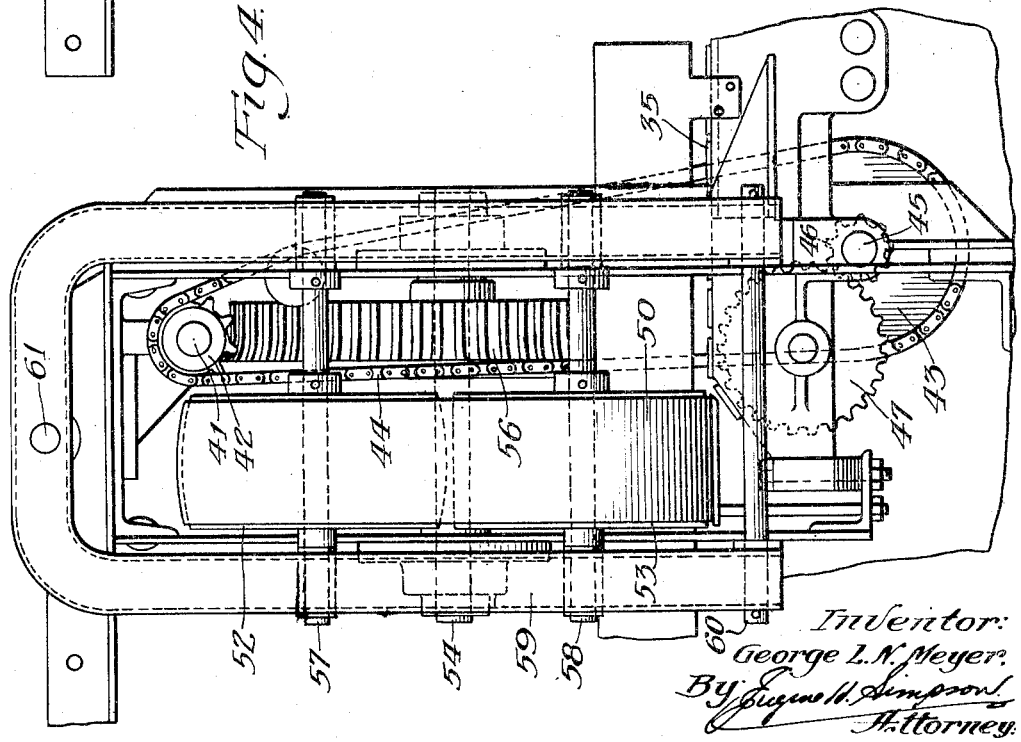
Inventor:
George L. N. Meyer.
By Eugene W. Simpson
Attorney.

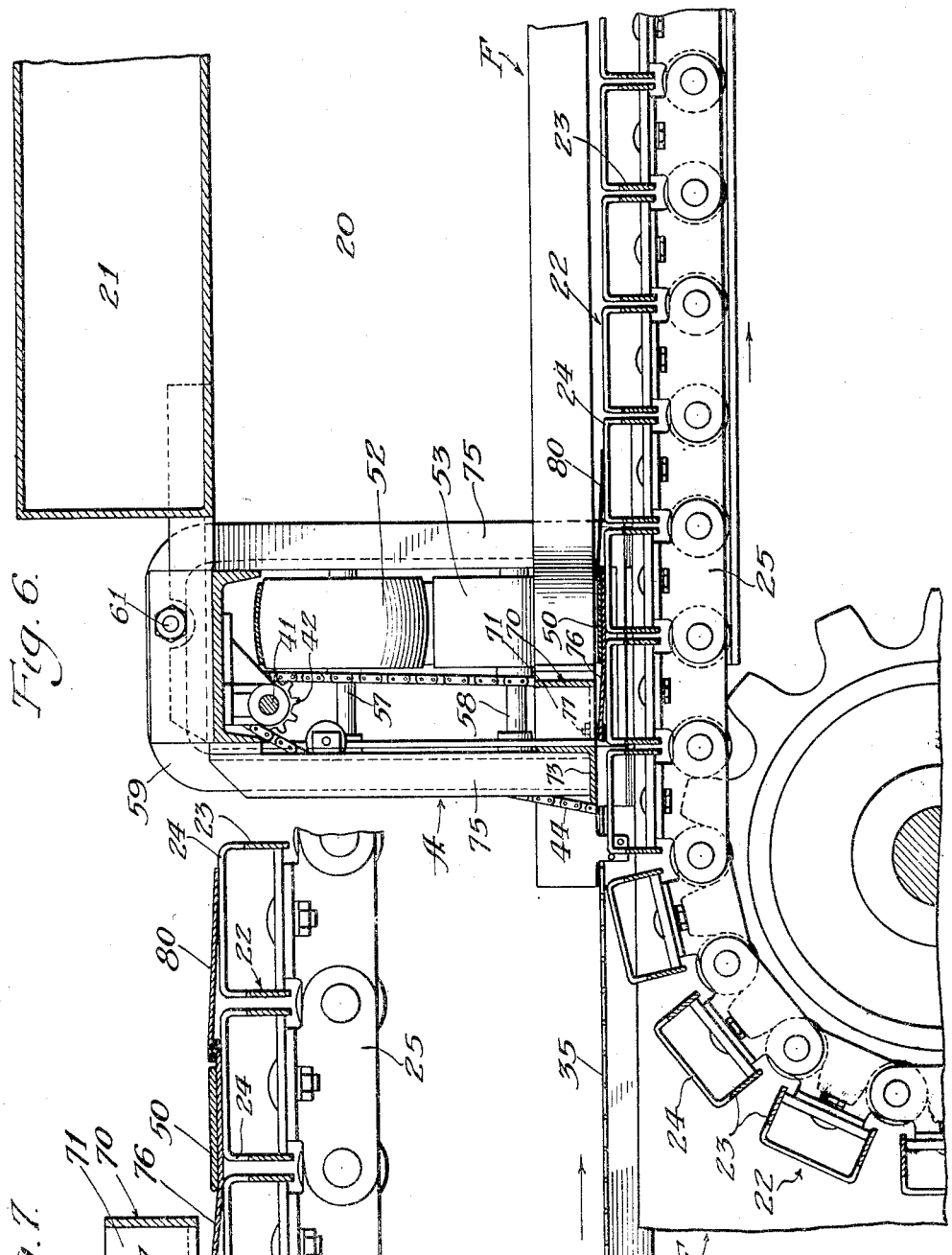

Patented Dec. 23, 1941

2,267,616

UNITED STATES PATENT OFFICE 2,267,616

CONVEYER

George L. N. Meyer, Milwaukee, Wis., assignor to George J. Meyer Manufacturing Company, Cudahy, Wis., a corporation of Wisconsin Application November 1, 1938, Serial No. 238,203

10 Claims. (Cl. 198—31)

This invention relates to conveyers and more particularly to a conveyer adapted to load containers onto a second conveyer.

In a spray type pasteurizer the containers are loaded at random on a comparatively wide conveyer plate which conveys the containers in a single plane the length of the pasteurizer and discharges them at the opposite end thereof.

One object of the present invention is to provide a loading conveyer that will load containers uniformly and continuously across the width of a comparatively wide conveyer.

Another object is to provide a loading conveyer operating across a second conveyer which will be comparatively free from wear.

A further object is to provide a cross conveyer operating over a comparatively wide conveyer which may be adjusted for tension.

A further object is to provide a cross conveyer traveling over and across a steel plate conveyer in which the possibility of the edges of the steel conveyer catching on the cross or loading conveyer is eliminated.

Another object is to provide a cross or loading conveyer which will cause a plurality of containers to discharge themselves automatically onto the main conveyer across the width thereof.

Other objects will be apparent from the following description.

In the drawings:

Fig. 3 is a plan section taken on the line 3—3 of Fig. 2;

Fig. 4 is an enlarged end elevational view of one end of the cross or loading conveyer;

Fig. 5 is an enlarged vertical sectional view taken on the line 5—5 of Fig. 2;

Fig. 6 is a transverse sectional view taken on the line 6—6 of Fig. 3; and

Fig. 7 is an enlarged sectional view of a portion of Fig. 6 showing the infeed apron.

Figure 1:
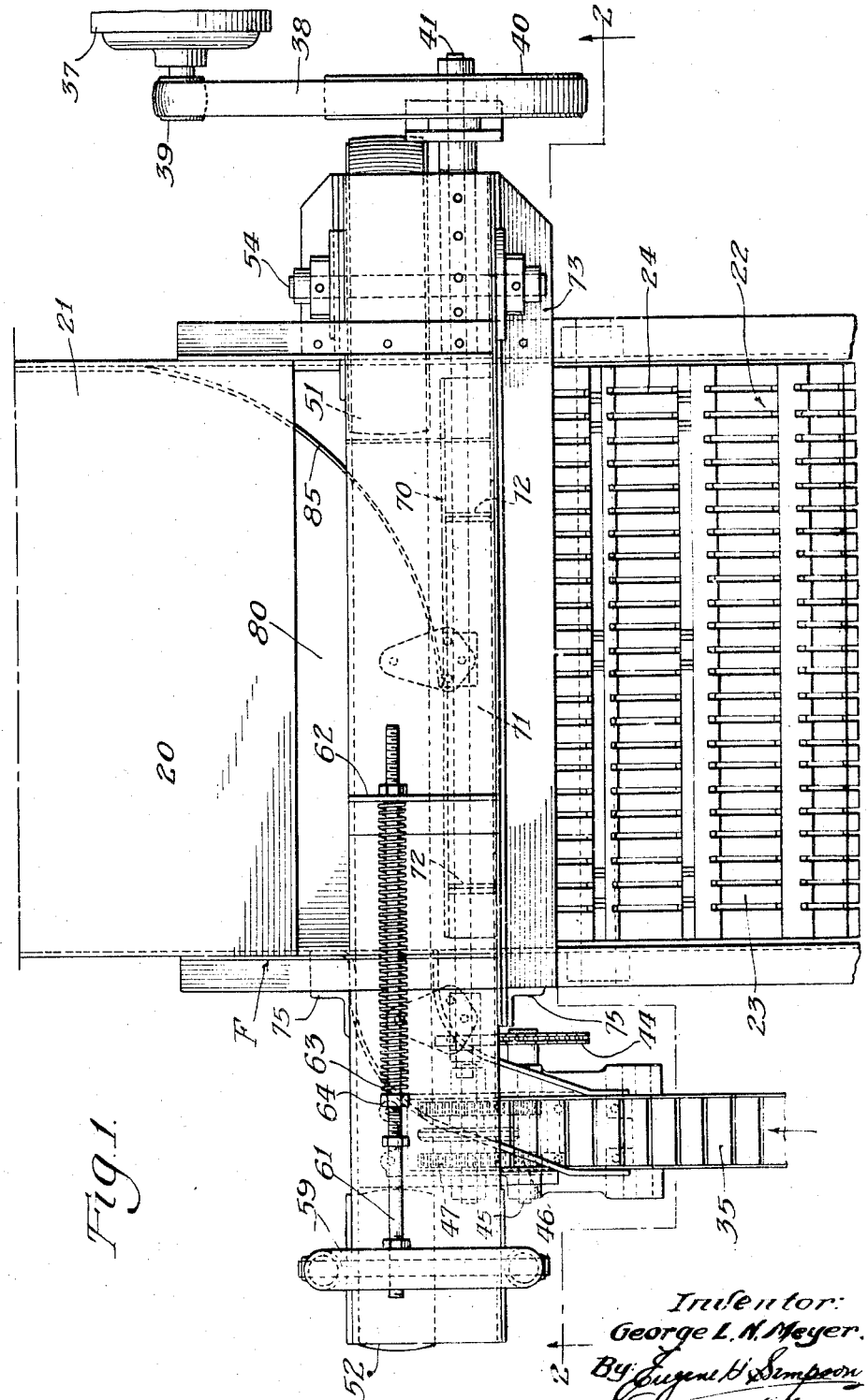
Fig. 1 is a plan view of the pasteurizer showing the drive and the conveyer.

Referring to the drawings, in which like numerals indicate like parts throughout the several views, the machine comprises a pasteurizing chamber designated 20 containing a plurality of pasteurizing tanks 21, one of which is shown, which spray warm water in varying temperatures over the containers which are being transported through the length of the pasteurizer on the channel plate conveyer, generally designated 22.

The conveyer 22 comprises a plurality of channel shaped conveyer plates 23 having slots 24 cut thereacross to receive pick-off fingers. The channels are connected through base plates 25, fixed between the legs of each channel, to chain links 26, which have wheels 27 running on angle iron tracks 28 extending between sprocket wheels 29. The sprocket wheels 29 reverse the direction of travel of the conveyer and return the conveyer plates to the opposite end of the machine.

The conveyer 22 is relatively wide, varying in width from four to ten feet or more, and therefore accommodates a large number of containers across its width.

Containers are ordinarily transmitted from a capper by a transmitting conveyer 35. The conveyer 35 is driven by an electric motor or other power source 37 by means of a belt 38 which operates over pulleys 39 and 40 to drive a shaft 41. The shaft 41 carries a sprocket 42 which operates a second sprocket 43 through a chain 44. The sprocket 43 is mounted on a shaft 45 which turns a spur gear 46 which drives the conveyer 35 through a gear 47.

As containers approach the discharge end of the conveyer 35 they are deflected off the conveyer 35 and onto a cross or loading conveyer 50. The conveyer 50 is composed of an endless belt driven by a driving pulley 51 on one side of the machine and supported over a pair of driven pulleys 52—53 at the opposite side of the machine. The driving pulley 51 is mounted on a shaft 54 which is driven from the shaft 41 through a worm 55 and worm wheel 56.

The driven pulleys 52 and 53 are carried by shafts 57 and 58, respectively, which are mounted in a yoke 59. The yoke 59 is mounted for limited pivotal movement on a shaft 60 carried by the conveyer frame, generally designated A, so that, as the yoke swings on its pivot, it changes the positions of the pulleys 52 and 53 and thus varies the tension on the belt conveyer 50.

Figure 2:
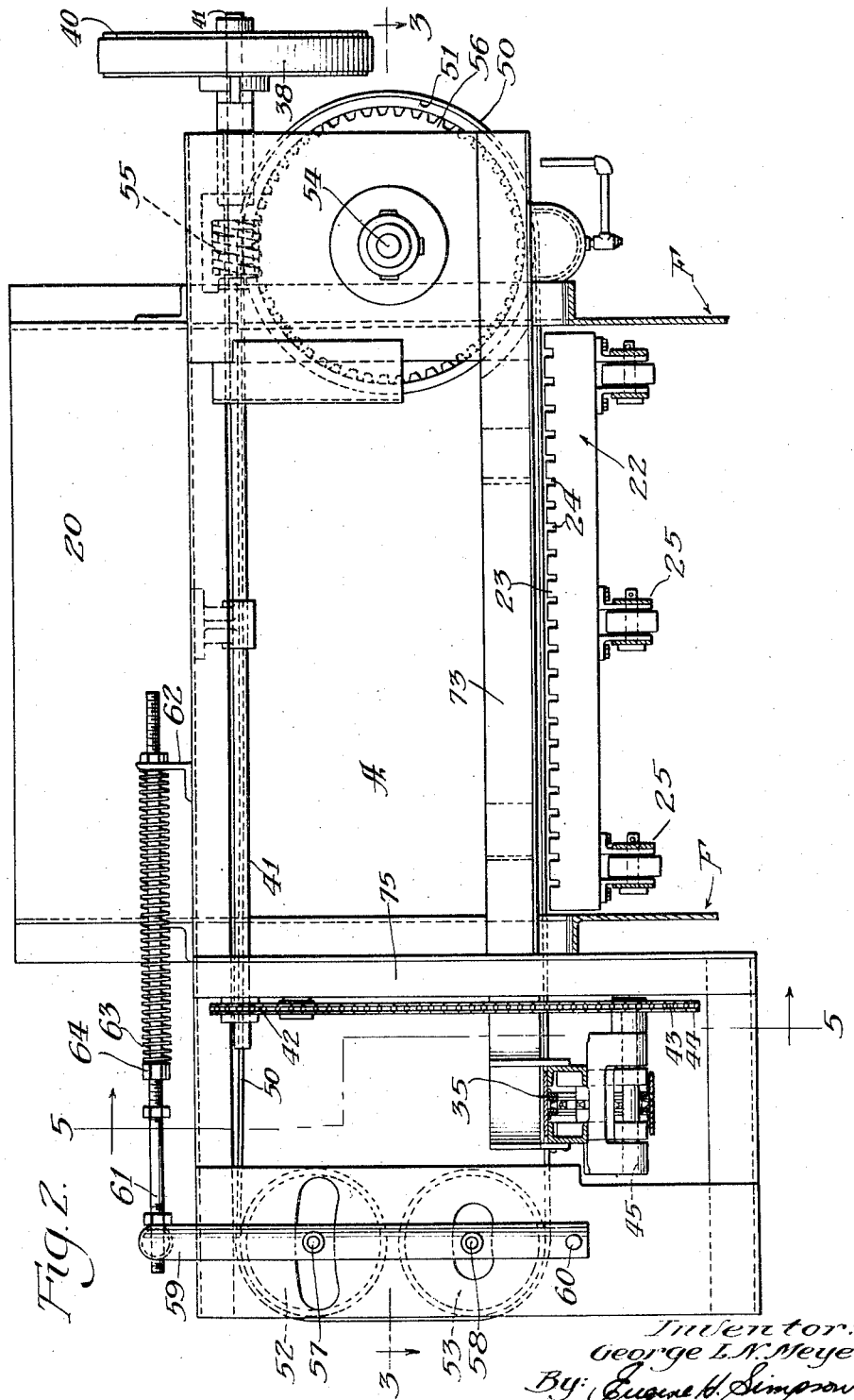
Fig. 2 is a cross-section taken on the line 2—2 of Fig. 1.

A tie rod 61, best seen in Figs. 1 and 2, is connected to the yoke 59 and passes through a hole in an angle iron 62 carried on the frame of the machine. A spring 63 is positioned on the rod and presses out against a nut 64 and the angle iron 62 to regulate the tension on the belt conveyer 50. Proper tension is obtained by suitably positioning the nut 64 on the rod 61. A nut 65 limits the outward movement of the rod 61.

The conveyer 50 has a guide 70 the arrangement of which is best shown in Figs. 3 and 7. The guide 70 is formed by the back of an angle iron 71 with short vertical angle irons 72—72 fixed thereon. The angles 72 are connected to a supporting angle 73 which is carried by two of four vertical angles 75 fixed to the frame F of the machine. The vertical angles 75 serve to secure the frame A of the conveyer 50 and all other parts thereof on the frame F of the pasteurizer.

In order to reduce the wear on the belt and to insure against the edges of the belt 50 catching on the edges of the conveyer plates 23, a guard 76 in the form of a plate extending throughout the width of the conveyer plate 23 is secured to the guide 70 by bolts 77. The edge of the guard 76, which is secured to the guide 70, is held above the top surface of the conveyer plates 23 while the remainder of the guard rides directly on top of the conveyer plates 23. The belt conveyer 50 travels on top of the guard 76, so that the guard is interposed between the conveyers 22 and 50. This not only prevents damage to the belt 50, from the conveyer plates catching on the plates 23, but materially reduces wear on the belt 50.

An apron 80 is secured to the guard 76 at the edge opposite the securing bolts 77 in any convenient manner, such as by riveting, as shown. The inner edge of the apron is parallel to and closely adjacent the belt 50 with the top of the apron level with the top of the belt. The apron 80 slopes downwardly toward the conveyer 22 with the outer edge of the apron riding directly on top of the conveyer plates 23. The apron 80 forms a sloping platform down which the containers may slide onto conveyer 22.

As best shown in Figs. 1 and 3, the end of the cross conveyer 50 is provided with an arcuate deflector 85 which deflects and guides the end containers off the conveyer 50, over the apron 80 and onto the conveyer 22. As the containers strike the deflector 85, the following containers bunch and force or squeeze each other off the cross or loading conveyor 50 onto the apron 80 and onto the conveyer 22.

Due to the fact that the cross conveyer 50 travels at a much greater lineal speed than the conveyer 22 the containers forced off the conveyer 50 are closely packed on the conveyer 22 and when running at or near capacity the conveyer 22 is substantially uniformly loaded by the cross conveyer 50.

Having thus described the invention it is realized that it is susceptible to various changes and modifications and it is therefore not desired to limit the invention to the precise form herein shown and described but only by the scope of the appended claims.

The invention is hereby claimed as follows:

1. In a device of the character described, a conveyer, a second conveyer operating over and transversely across said first named conveyer, a container guide on one side of said second conveyer, a deflector at one end of said second conveyer adapted to deflect containers off said end and to cause containers to be squeezed off the second conveyer and onto the first conveyer throughout the width of said first conveyer, a guard positioned between said conveyers to prevent said second conveyer from becoming caught on said first conveyer, and an apron sloping downwardly from the top of the second conveyer surface to the surface of said first conveyer.

2. In a device of the character described, a conveyer, a belt conveyer operating over and transversely across said first named conveyer, a container guide on one side of said belt conveyer, a deflector at one end of said belt conveyer adapted to deflect containers off said end and to cause containers to be squeezed off the belt conveyer and onto the first conveyer throughout the width of said first conveyer, a guard positioned between said conveyers to prevent said belt conveyer from becoming caught on said first conveyer, an apron sloping downwardly from the top of the belt conveyer surface to the surface of said first conveyer, and means to adjust the tension of the belt.

3. In a device of the character described, a conveyer, a second conveyer operating over and transversely across said first named conveyer, a container guide on one side of said second conveyer, a deflector at one end of said second conveyer adapted to deflect containers off said end and to cause containers to be squeezed off the second conveyer and onto the first conveyer throughout the width of said first conveyer, a guard carried by said guide and extending between said conveyers to prevent said second conveyer from becoming caught on said first conveyer, and an apron sloping downwardly from the top of the second conveyer surface to the surface of the first conveyer.

4. In a device of the character described, a conveyer, a belt conveyer operating over and transversely across said first named conveyer, a container guide on one side of said belt conveyer, a deflector at one end of said belt conveyer adapted to deflect containers off said end and to cause containers to be squeezed off the belt conveyer and onto the first conveyer throughout the width of said first conveyer, a guard carried by said guide and extending between said conveyers to prevent said belt conveyer from becoming caught on said first conveyer, an apron sloping downwardly from the top of the belt conveyer surface to the surface of the first conveyer, and means to adjust the tension of the belt.

5. In a device of the character described, a conveyer, a second conveyer operating over and transversely across said first named conveyer, a container guide on one side of said second conveyer, a deflector at one end of said second conveyer adapted to deflect containers off said end and to cause containers to be squeezed off the second conveyer and onto the first conveyer throughout the width of said first conveyer, a guard positioned between said conveyers to prevent said second conveyer from becoming caught on said first conveyer, and an apron carried by said guard and sloping downwardly from the top of the second conveyer surface to the surface of the first conveyer.

6. In a device of the character described, a conveyer, a belt conveyer operating over and transversely across said first named conveyer, a container guide on one side of said belt conveyer, a deflector at one end of said belt conveyer adapted to deflect containers off said end and to cause containers to be squeezed off the belt conveyer and onto the first conveyer throughout the width of said first conveyer, a guard positioned between said conveyers to prevent said belt conveyer from becoming caught on said first conveyer, an apron carried by said guard and sloping downwardly from the top of the belt conveyer surface to the surface of the first conveyer, and means to adjust the tension of the belt.

7. In a device of the character described, a conveyer, a second conveyer operating over and transversely across said first named conveyer, a container guide on one side of said second conveyer, a deflector at one end of said second conveyer adapted to deflect containers off said end and to cause containers to be squeezed off the second conveyer and onto the first conveyer throughout the width of said first conveyer, a guard carried by said guide and extending between said conveyers to prevent said second conveyer from becoming caught on said first conveyer, and an apron formed on said guard and sloping from the top of said second conveyer surface to said first conveyer surface.

8. In a device of the character described, a conveyer, a belt conveyer operating over and transversely across said first named conveyer, a container guide on one side of said belt conveyer, a deflector at one end of said belt conveyer adapted to deflect containers off said end and to cause containers to be squeezed off the belt conveyer and onto the first conveyer throughout the width of said first conveyer, a guard carried by said guide and extending between said conveyers to prevent said belt conveyer from becoming caught on said first conveyer, an apron formed on said guard and sloping from the top of said belt conveyer surface to said first conveyer surface, and means to adjust the tension of said belt.

9. In a pasteurizer of the character described, a conveyer, a second conveyer operating over and transversely across said first named conveyer, a container guide on one side of said second conveyer, an arcuate deflector at one end of said second conveyer fixed between said guide and the interior of the pasteurizer and adapted to deflect containers off said end and to cause containers to be squeezed off the second conveyer and onto the first conveyer throughout the width of said first conveyer, and a guard carried by said guide and extending between said conveyers to prevent said second conveyer from becoming caught on said first conveyer.

10. In a pasteurizer of the character described, a conveyer, a second conveyer operating over and transversely across said first named conveyer, a container guide on one side of said second conveyer, an arcuate deflector at one end of said second conveyer fixed between said guide and the interior of the pasteurizer and adapted to deflect containers off said end and to cause containers to be squeezed off the second conveyer and onto the first conveyer throughout the width of said first conveyer, a guard carried by said guide and extending between said conveyers to prevent said second conveyer from becoming caught on said first conveyer, and an apron formed on said guard and sloping from the top of said second conveyer surface to said first conveyer surface.

GEORGE L. N. MEYER.